United States Patent
N et al.

(10) Patent No.: US 11,233,741 B1
(45) Date of Patent: Jan. 25, 2022

(54) REPLICATION MODE SELECTION FOR EVPN MULTICAST

(71) Applicant: Juniper Networks, Inc., Sunnyvale, CA (US)

(72) Inventors: Vinod Kumar N, Bangalore (IN); Robert W. Kebler, Newburyport, MA (US); Michal Styszynski, Cupertino, CA (US); Dinesh Sivaraj, Bangalore (IN); Vikram Nagarajan, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 16/948,092

(22) Filed: Sep. 2, 2020

(51) Int. Cl.
*G06F 15/16* (2006.01)
*H04L 12/801* (2013.01)
*H04L 12/721* (2013.01)
*H04L 12/761* (2013.01)
*H04L 12/707* (2013.01)
*H04L 12/927* (2013.01)

(52) U.S. Cl.
CPC ............ *H04L 47/15* (2013.01); *H04L 45/16* (2013.01); *H04L 45/24* (2013.01); *H04L 45/66* (2013.01); *H04L 47/806* (2013.01)

(58) Field of Classification Search
CPC ....... H04L 47/15; H04L 45/16; H04L 47/806; H04L 45/66
See application file for complete search history.

(56) References Cited

U.S. PATENT DOCUMENTS

| | | | | |
|---|---|---|---|---|
| 8,953,590 | B1* | 2/2015 | Aggarwal | H04L 45/74 370/389 |
| 10,020,952 | B1* | 7/2018 | Cai | H04L 12/1886 |
| 2004/0243741 | A1* | 12/2004 | Shin | H04L 12/1827 710/33 |
| 2009/0122734 | A1* | 5/2009 | Kim | H04W 28/06 370/310 |
| 2018/0367451 | A1* | 12/2018 | Gulrajani | H04L 45/54 |
| 2019/0058635 | A1* | 2/2019 | Nandy | H04L 12/185 |
| 2019/0116053 | A1* | 4/2019 | Allan | H04L 12/4633 |
| 2019/0386881 | A1* | 12/2019 | Dutta | H04L 45/028 |
| 2020/0145335 | A1 | 5/2020 | Wijnands et al. | |

(Continued)

OTHER PUBLICATIONS

Extended Search Report from counterpart European Application No. 20209496.7, dated May 18, 2021, 11 pp.

(Continued)

*Primary Examiner* — Hieu T Hoang
(74) *Attorney, Agent, or Firm* — Shumaker & Sieffert, P.A.

(57) ABSTRACT

The techniques describe example network systems for adaptively determining whether to perform ingress replication or assisted replication of a multicast flow based on classification of the multicast flow. For example, a provider edge (PE) device of a plurality of PE devices participating in an EVPN comprises one or more processors operably coupled to a memory, wherein the one or more processors are configured to: receive a multicast traffic flow, determine a classification of the multicast traffic flow, and perform, based at least in part on the classification of the multicast traffic flow, one of: ingress replication of the multicast traffic flow or assisted replication of the multicast traffic flow.

20 Claims, 3 Drawing Sheets

(56) References Cited

U.S. PATENT DOCUMENTS

2021/0297276 A1* 9/2021 Homma .............. H04L 12/4641

OTHER PUBLICATIONS

Rabadan et al., "Optimized Ingress Replication solution for EVPN; draft-ietf-bess-evpn-optimized-ir-06.txt", BESS Workgroup, Oct. 19, 2018, 26 pp.
Sajassi, IGMP and MLD Proxy for EVPN, draft-ietf-bess-evpn-igmp-mld-proxy-04, Internet-Draft, Sep. 30, 2019, 33 pp.
Adams, A. et al., "Protocol Independent Multicast Version 2-Dense Mode Specification," RFC 3973, Jan. 2005, 62 pp.
Fenner, B., et al., "Protocol Independent Multicast-Sparse Mode (PIM-SM): Protocol Specification (Revised)," RFC 4601, Aug. 2006, 151 pp.
Holbrook, H. and B. Cain, "Source-Specific Multicast for IP," RFC 4607, Aug. 2006, 20 pp.
Handley, M., et al., "Bidirectional Protocol Independent Multicast (BIDIRPIM)," RFC 5015, Oct. 2007, 44 pp.

\* cited by examiner

REPLICATION MODE SELECTION FOR EVPN MULTICAST

TECHNICAL FIELD

The disclosure relates to computer networks and, more particularly, to routing packets within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

A network may support multicasting. Multicast traffic may include Internet Protocol Television (IPTV), desktop conferences, corporate broadcasts, music and video web casts, and other forms of multimedia content. The network may utilize protocol independent multicast (PIM) as a multicast routing protocol to control delivery of multicast traffic from multicast sources to multicast receivers for particular multicast groups.

In some examples, the network that distributes multicast packets may include an Ethernet Virtual Private Network (EVPN), which may be used to extend two or more layer two (L2) customer networks through an intermediate layer three (L3) network (usually referred to as a provider network or core network), in a transparent manner, i.e., as if the intermediate L3 network does not exist. In particular, the EVPN transports L2 communications, such as Ethernet packets or "frames," between customer networks via traffic engineered label switched paths (LSP) through the intermediate network in accordance with one or more multiprotocol label switching (MPLS) protocols. In a typical configuration, provider edge (PE) devices (e.g., routers and/or switches) coupled to the customer edge (CE) network devices of the customer networks define label switched paths (LSPs) within the provider network to carry encapsulated L2 communications as if these customer networks were directly attached to the same local area network (LAN). In some configurations, the PE devices may also be connected by an IP infrastructure in which case IP/GRE tunneling or other IP tunneling can be used between the network devices.

A multicast source may send multicast traffic to one or more PE devices of the EVPN to reach one or more multicast receivers. A PE device that receives the multicast traffic may perform replication of the multicast traffic and may forward each replicated copy of the multicast traffic to the multicast receivers.

SUMMARY

In general, this disclosure describes techniques of a network system providing an ingress provider edge (PE) device that is able to receive multicast traffic from a multicast source device and to selectively perform ingress replication or assisted replication to forward multicast traffic through the EVPN to multicast receivers. In ingress replication, the ingress PE device may operate to replicate the multicast traffic to forward replicated copies of the multicast traffic through the EVPN. In assisted replication, the ingress PE device may forward the multicast traffic to a replicator PE device within the EVPN that operates to replicate the multicast traffic and to forward replicated copies of the multicast traffic through the EVPN.

A replicator PE device may be able to more efficiently handle replicating and forwarding of multicast traffic compared with an ingress PE device. For example, a replicator PE device may have a greater capacity for replicating and forwarding multicast traffic compared with an ingress PE device. As such, companies and other organizations may potentially improve their network's multicast traffic replication performance by deploying replicator PE devices within their network to perform assisted replication of multicast traffic.

However, it may be relatively expensive for an organization to deploy a large number of replicator PE devices within the organization's network to perform assisted replication for handling surges in multicast traffic replication loads. Further, while some replicator PE devices may be standalone PE devices, some replicator PE devices may be co-located on a PIM routing device, such as on a border leaf PE device. When a replicator PE device is co-located on a PIM routing device, the PIM routing device may experience heavy processing loads while performing both assisted replication functionality as well as routing functionality. In addition, because ingress PE devices are also able to perform ingress replication to handle multicast traffic replication loads, utilizing only assisted replication to replicate multicast traffic may cause the replication capacity of ingress PE devices to be underutilized.

As such, according to the disclosed techniques, an ingress PE device within an EVPN traffic may, in response to receiving a multicast traffic flow, determine whether to perform ingress replication or assisted replication in order to replicate the multicast traffic flow. Specifically, the ingress PE device may determine whether to perform ingress replication or assisted replication for a multicast traffic flow based on classifying the multicast traffic flow as being more suitable for ingress replication or for assisted replication. As the ingress PE device receives a multicast traffic flow, the ingress PE device may switch between performing ingress replication and assisted replication for the multicast traffic flow.

In one example, a multicast traffic flow may be classified based on the bandwidth used by the multicast traffic flow. A multicast traffic flow that uses relatively less bandwidth may be classified as being more suitable for ingress replication while a multicast traffic flow that uses relatively more bandwidth may be classified as being more suitable for assisted replication. In another example, a multicast traffic flow may be classified based on the number of interested receivers for the multicast traffic flow. A multicast traffic flow having relatively smaller number of interested receivers may be classified as being more suitable for ingress replication while a multicast traffic flow having relatively larger number of interested receivers may be classified as being more suitable for assisted replication.

The techniques described in this disclosure may provide one or more technical advantages that realizes a practical application. For example, by adaptively determining, for a multicast flow, whether to perform ingress replication or assisted replication, the techniques described in disclosure enables replication loads to be distributed amongst both ingress PE devices that perform ingress replication and replicator PE devices that perform assisted replication in ways that prevent both the underutilization of the replication load capacities of ingress PE devices and the overutilization of replicator PE devices, thereby increasing the performance of an EVPN that performs replication of multicast traffic flows.

In some examples, a method includes receiving, by an ingress provider edge (PE) device of a plurality of PE devices that participate in an Ethernet Virtual Private Network (EVPN), a multicast traffic flow. The method further includes determining, by the ingress PE device, a classification of the multicast traffic flow. The method further includes performing, by the ingress PE device and based at least in part on the classification of the multicast traffic flow, one of: ingress replication of the multicast traffic flow or assisted replication of the multicast traffic flow.

In some examples, a network device operable as an ingress provider edge (PE) device of a plurality of PE devices participating in an Ethernet Virtual Private Network (EVPN), includes a memory. The network device further includes one or more processors operably coupled to the memory, wherein the one or more processors are configured to: receive a multicast traffic flow; determine a classification of the multicast traffic flow; and perform, based at least in part on the classification of the multicast traffic flow, one of: ingress replication of the multicast traffic flow or assisted replication of the multicast traffic flow.

In some examples, a system includes a flow controller device configured to perform ingress multicast flow monitoring on a plurality of PE devices that participate in an Ethernet Virtual Private Network (EVPN). The system further includes an ingress provider edge (PE) device of the plurality of PE devices that participate in the EVPN and configured to: receive a multicast traffic flow; and export multicast flow records associated with the multicast traffic flow to the flow controller device. The flow controller device is further configured to: determine, based at least in part on the multicast flow records, a classification of the multicast traffic flow, and send an indication of the classification of the multicast traffic flow to the ingress PE device. The ingress PE device is further configured to: receive the indication of the classification of the multicast traffic flow, and perform, based at least in part on the classification of the multicast traffic flow, one of: ingress replication of the multicast traffic flow or assisted replication of the multicast traffic flow.

The details of one or more embodiments are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
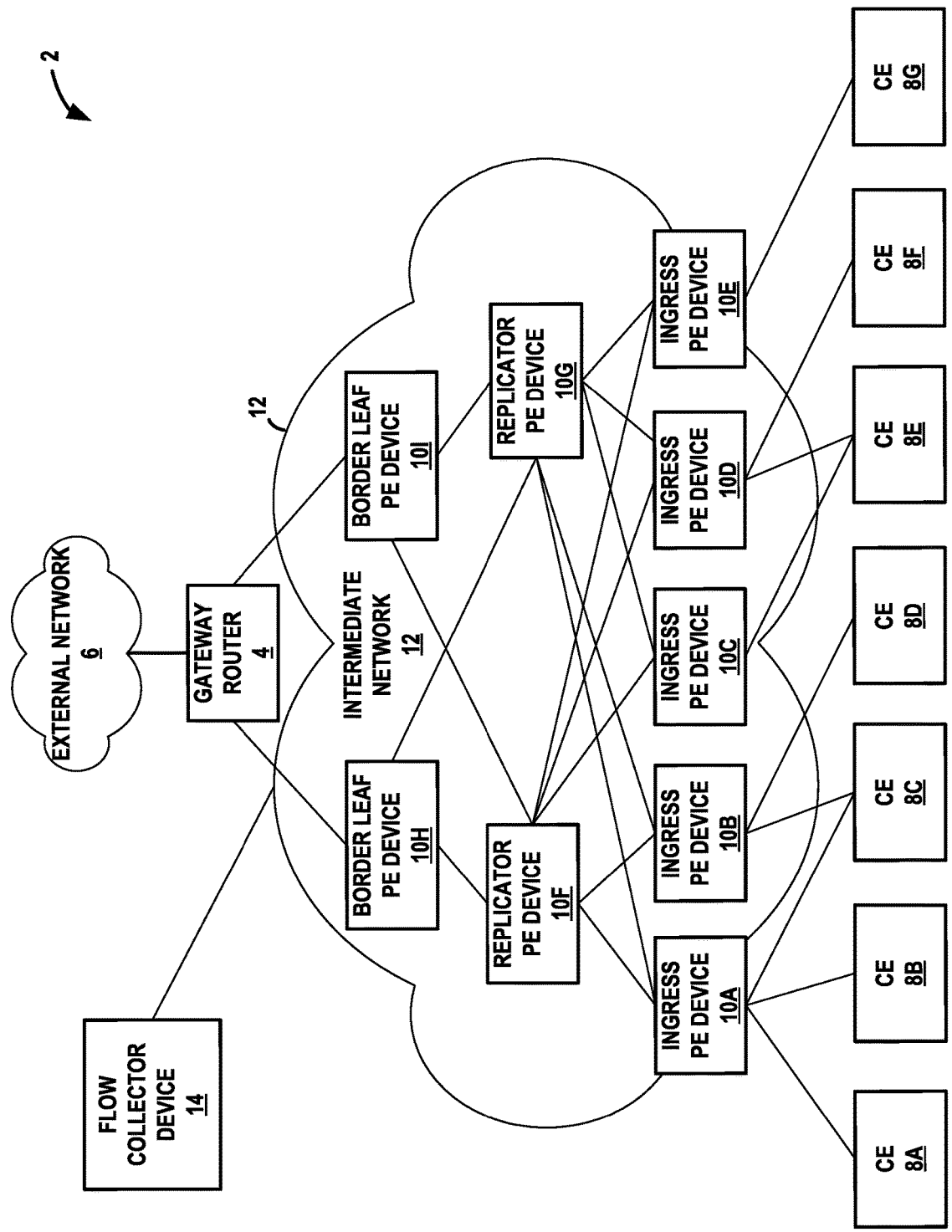
FIG. 1 is a block diagram illustrating an example network system for replicating multicast traffic flows, in accordance with the techniques described in this disclosure.

FIG. 1 is a block diagram illustrating an example network system 2 for replicating multicast traffic flows, in accordance with the techniques described in this disclosure. As shown in FIG. 1, network system 2 includes intermediate network 12 that hosts an EVPN fabric made up of PE devices 10A-10I ("PE devices 10 or, more simply, "PEs 10"). PE devices 10 may each represent a router, switch, aggregation device (AD), or other type of network device capable of participating in a level 2 virtual private network (L2VPN) service, such as the EVPN provided by intermediate network 12.

PE devices 10A-10E are ingress provider edge (PE) devices to forward multicast traffic into an EVPN of a core network, in accordance with techniques described in this disclosure by providing devices with access to an intermediate layer 3 (L3) network (here, "intermediate network 12") via customer edge (CE) devices 8A-8G ("CE devices 8" or, more simply, "CEs 8"). PE devices 10A-10E may communicate with CE devices 8 via communication links such as Ethernet, ATM, or any other suitable network connections.

CE devices 8 may each represent a host, router, switch, or other suitable network device that participates in an EVPN. CE devices 8 may be edge devices for customer networks (not shown in the example of FIG. 1), such as geographically or logically separated sites of an enterprise, networks for different customers of the intermediate network 12, or tenants or tenant systems of an intermediate network 12 for a data center. In the example of FIG. 1, CE devices 8A is a multicast source that sends multicast traffic for a multicast group, and CE devices 8B-8G are multicast receivers that join a multicast group to receive multicast traffic from a multicast source, such as CE device 8A.

Customer networks may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Intermediate network 12 may represent a service provider network that is owned and operated by a service provider, which is usually large telecommunications entity or corporation. Intermediate network 12 represents an L3 computer network, where reference to a layer followed by a number refers to a corresponding layer in the Open Systems Interconnection (OSI) model. Intermediate network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the "IP layer" in the TCP/IP model, and the term L3 may be used interchangeably with the and "network layer" and "IP" throughout this disclosure.

Intermediate network 12 may be coupled to one or more networks administered by the provider of intermediate network 12 or other providers and may thus form part of a large-scale public network infrastructure, e.g., the Internet. In this example, border leaf PE devices 10H and 10I of intermediate network 12 are coupled via gateway router 4 to external network 6, such as the Internet. Intermediate network 12 may provide computing devices within customer networks of the PE device 10 with access to the Internet and may allow the computing devices within the customer networks to communicate with each other. In some cases, intermediate network 12 represents a data center L2/L3 switching fabric (or "data center fabric network") that interconnects CE devices for tenants of the data center, where a tenant may represent an organization or a logical partitioning of resources, data, and/or applications within the data center.

Although additional network devices are not shown for ease of explanation, it should be understood that network system 2 is merely an example and may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 2 are illustrated as being directly coupled, it should be understood that one or more additional network elements may be included along any of the illustrated links 15 such that the network elements of network system 2 are not directly coupled.

Intermediate network 12 may provide a number of residential and business services, including residential and business class data services (which are often referred to as "Internet services" in that these data services permit access to the collection of publicly accessible networks referred to as the Internet), residential and business class telephone and/or voice services, and residential and business class television services. One such business class data service offered by a service provider intermediate network 12 includes L2 EVPN service (and may be referred to herein as "EVPN core" or simply "EVPN"). An EVPN is a service that provides a form of L2 connectivity across an intermediate L3 network, such as intermediate network 12, to interconnect two or more L2 customer networks, such as L2 customer networks 6, that may be located in different geographical areas (in the case of service provider network implementation) and/or in different racks (in the case of a data center implementation). Often, EVPN is transparent to the customer networks in that these customer networks are not aware of the intervening intermediate network and instead act and operate as if these customer networks were directly connected and formed a single L2 network. In a way, EVPN enables a form of a transparent LAN connection between two customer sites that each operates a L2 network and, for this reason, EVPN may also be referred to as a "transparent LAN service."

To configure an EVPN, a network operator of the intermediate network 12 configures, via configuration or management interfaces, various devices included within intermediate network 12 that interface with customer networks. The EVPN configuration may include an EVPN instance (EVI), which includes of one or more broadcast domains. Generally, an EVI may be associated with a virtual routing and forwarding instance (VRF) (not shown) on a PE device, such as any of PE devices 10A-10I.

An EVPN instance (EVI) is configured within intermediate network 12 to enable computing devices of customer networks of the PE devices 10 to communicate with one another via the EVI as if the computing devices were directly connected via a L2 network or link. For example, CE device 8B is able to communicate with CE device 8A using the EVI as if CE devices 8A and 8B were directly connected via an L2 network or link. As described herein, an EVI is an EVPN instance spanning PE devices 10A-10I participating in the EVPN. Each of PE devices 10 is configured with the EVI and exchanges EVPN routes to implement the EVI.

An EVPN may operate over a Multi-Protocol Label Switching (MPLS) configured network and use MPLS labels to forward network traffic accordingly. MPLS is a mechanism used to engineer traffic patterns within Internet Protocol (IP) networks according to the routing information maintained by the routers in the networks. By utilizing MPLS protocols, such as the Label Distribution Protocol (LDP) or the Resource Reservation Protocol with Traffic Engineering extensions (RSVP-TE), a source device can request a path through a network to a destination device, e.g., a Label Switched Path (LSP). An LSP defines a distinct path through the network to carry MPLS packets from the source device to a destination device. Using an MPLS protocol, each router along an LSP allocates a label and propagates the label to the closest upstream router along the path. Routers along the path add or remove the labels and perform other MPLS operations to forward the MPLS packets along the established path.

As shown in the example of FIG. 1, intermediate network 12 may provide an MPLS core or IP tunneling infrastructure for sending network packets to and from CE devices 8, which may include sending the network packets over a mesh of tunnels interconnecting PE devices 10. Intermediate network 12 may include additional PE devices 10. Each of PE devices 10A-10I implement the MPLS protocol and apply one or more MPLS labels, e.g., a label stack, to network packets in accordance with routing and forwarding information configured at each respective PE device. In an EVPN, a label stack applied to a network packet may include multiple labels. For instance, a label stack may include an outer label and an inner label.

PE devices 10A-10I may communicate, for example, using the Border Gateway Protocol (BGP) to transport BGP Network Layer Reachability Information (NLRI) for the EVPN and may define different EVPN route types for conveying EVPN information via the BGP routing protocol. The EVPN NLRI is typically carried in BGP using BGP Multiprotocol Extensions.

In the example of FIG. 1, when providing the EVPN service to customer networks, PE devices 10 and CE devices 8 perform MAC address learning to efficiently forward L2 network communications in network system 2. That is, as PE devices 10 and CE devices 8 forward Ethernet frames, the routers learn L2 state information for the L2 network, including MAC addressing information for endpoint devices within the network and the physical ports through which the endpoint devices are reachable. PE devices 10 and CE devices 8 typically store the MAC addressing information in MAC tables associated with respective interfaces. When forwarding an individual Ethernet frame received on one interface, a network device typically broadcasts the Ethernet frame to all other interfaces associated with the EVPN unless the router has previously learned the specific interface through which the destination MAC address specified in the Ethernet frame is reachable.

Moreover, as PE devices 10 learn the MAC addresses for devices reachable through local attachment circuits (e.g., CE devices 8), the PE devices 10 use MAC address route advertisements of an L3 routing protocol (e.g., Multi-Protocol BGP (MP-BGP)) to share the learned MAC addresses and to provide an indication that the MAC addresses are reachable through the particular PE device that is issuing the route advertisement. In the EVPN implemented using PE devices 10 for a given EVI, each of PE devices 10 advertises the locally learned MAC addresses to other PE devices 10 using a BGP route advertisement, also referred to herein as a "MAC route," "MAC Advertisement route," or "MAC/IP Advertisement." As further described below, a MAC route typically specifies an individual MAC address of devices along with additional forwarding information, such as a route distinguisher, Ethernet tag identifier, MPLS label, etc. In this way, PE devices 10 use BGP to advertise and share the MAC addresses learned when forwarding layer two communications associated with the EVPN. Accordingly, PE devices 10 may perform both local learning and remote learning of MAC addresses.

Each of PE devices 10 uses MAC routes specifying the MAC addresses learned by other PE devices to determine how to forward L2 communications to MAC addresses that belong to devices connected to other PE devices, i.e., to remote CE devices and/or devices behind CE devices operatively coupled to PE devices. That is, each of PE devices 10 determine whether Ethernet frames can be sent directly to a particular one of the other CE devices, PE devices 10 or whether to treat the Ethernet frames as so called "BUM" traffic (Broadcast, Unidentified unicast or Multicast traffic) that is to be flooded within the EVPN based on the MAC addresses learning information received from the other PE devices 10.

System 2 may be configured to support multicast traffic over EVPN. Multicast traffic may include Internet Protocol Television (IPTV), desktop conferences, corporate broadcasts, music and/or video webcasts, and other forms of multimedia content, and may include Internet Protocol version 4 (IPv4) multicast, Internet Protocol version 6 (IPv6) multicasts, and the like. In general, multicast traffic is associated with specific multicast groups. More specifically, multicast traffic is typically designated by a unique combination for a particular multicast group (*, G) or Source-Group combination (S, G). In general, multicast forwarding state for (*, G) or (S, G) entries are the information by which network devices use for forwarding unicast or multicast packets. S is the source address, G is the multicast group address, and * represents any source sending to multicast group G. Network devices may keep track of the multicast forwarding state for the incoming and outgoing interfaces for each group. Multicast forwarding state for an entry stored by a network device may specify an output interface of the network device for multicast traffic matching the entry.

Multicast receivers, e.g., one or more CE devices 8B-8G, that join the multicast group may receive multicast traffic sourced from a multicast source, such as CE device 8A. To join a multicast group, multicast receiver may implement Internet Group Management Protocol (IGMP) by which the multicast receiver announces its interest in receiving particular multicast traffic. For example, a multicast receiver, e.g., a customer device connected to CE device 8C, may send an IGMP report (e.g., join or prune messages) to any immediately neighboring multicast routing devices, e.g., CE device 8C, to indicate its interest in receiving multicast traffic from multicast groups on a given virtual Local Area Network (VLAN). CE device 8C forwards the IGMP report to, for example, PE device 10B, which translates the IGMP report to Selective Multicast Ethernet Tag (SMET) routes (EVPN Type 6 route) and sends the SMET routes over the intermediate network 12 to PE devices belonging to the EVPN (e.g., PE devices 10A and 10C-10I) to distribute the intent of the multicast receiver to receive multicast traffic for a certain multicast group (*, G) or Source-Group combination (S, G). A SMET route may include a route distinguisher, Ethernet tag identifier, multicast source address, multicast group address, originator router address, etc. Additional examples of a SMET route is described in Sajassi, "IGMP and MLD Proxy for EVPN, draft-ietf-bess-evpn-igmp-mld-proxy-04, Internet-Draft, Sep. 30, 2019, the entire contents of which is incorporated by reference herein.

Each of PE devices 10 receives a respective one of the SMET routes, translates the SMET route back to an IGMP report, and sends the IGMP report to connected CE devices. For example, in response to receiving the SMET route from PE device 10B, PE device 10A translates the SMET route to an IGMP report, and sends the IGMP report to CE device 8A.

In some examples, network system 2 may also include a Rendezvous Point (RP) device (not shown). The RP device serves as an information exchange point in which multicast traffic from a multicast source and join messages from network devices of interested multicast receivers "rendezvous" at the RP device. The RP device may represent a router, switch, virtual machine running on a router or other suitable network device.

CE devices 8 and the RP device may use one or more multicast control plane protocols, such as Protocol Independent Multicast (PIM), to exchange multicast information for building and modifying multicast distribution trees and to control delivery of multicast traffic from multicast sources to multicast receivers for particular multicast groups over a layer 3 network, e.g., intermediate network 12. The PIM protocol may operate in several different modes, including Dense Mode (DM), Sparse Mode (SM) in Source-Specific Multicast (SSM) mode or Any Source Multicast (ASM) mode, and Bidirectional (BIDIR) mode. Additional information regarding PIM protocols may be found in Adams, A. et al., "Protocol Independent Multicast Version 2—Dense Mode Specification," RFC 3973, 2005; Fenner, B., et al., "Protocol Independent Multicast-Sparse Mode (PIM-SM): Protocol Specification (Revised)," RFC 4601, 2006; Holbrook, H. and B. Cain, "Source-Specific Multicast for IP," RFC 4607, 2006; and Handley, M., et al., "Bidirectional Protocol Independent Multicast (BIDIRPIM)," RFC 5015, 2007, the entire contents of each of which are incorporated by reference herein.

As one example, CE devices 8A and 8B receive IGMP reports from PE devices 10A and 10B, respectively, and creates PIM states based on IGMP reports. CE devices 8A and 8B then send PIM (*, G) join messages to the RP device. The RP device receives PIM (*, G) join messages and adds the interface on which it was received to the outgoing interface list (OIL) of the rendezvous-point tree (RPT) multicast forwarding state entry for (*, G). In this way, the RP device may forward multicast traffic from a multicast source for the group, G, such as CE device 8A, to one or more interested multicast receivers, such as CE device 8B.

To forward multicast traffic flow from a multicast source to multicast receivers, PE 10 may replicate a multicast traffic flow by making multiple copies of the multicast traffic flow for the multicast receivers. For example, when PE device 10A receives a multicast traffic flow from CE device 8A, PE device 10A may determine the multicast receivers interested in receiving the multicast traffic flow and may make a copy of the multicast traffic flow for each of the interested multicast receivers. Thus, for example, if CE device 8B, CE device 8C, and CE device 8D are interested in receiving the multicast traffic flow, PE 10A may perform replication of the multicast traffic flow received from CE device 8A by making 3 copies of the multicast traffic flow that are forwarded to CE device 8B, CE device 8C, and CE device 8D.

PE devices 10 may perform two types of replication: ingress replication and assisted replication. In ingress replication, the ingress PE device that receives the multicast traffic flow from a multicast source may operate to replicate the multicast traffic flow to forward replicated copies of the multicast traffic through the EVPN to multicast receivers interested in the multicast traffic flow. Thus, in the example where CE device 8A is the multicast source and where CE device 8B, CE device 8C, and CE device 8D are interested in receiving the multicast traffic flow, ingress PE device 10A may perform ingress replication of the multicast traffic flow and may forward the copies of the multicast traffic flow to CE device 8B, CE device 8C, and CE device 8D.

In assisted replication, the ingress PE device may forward the multicast traffic to a replicator PE device within the EVPN that operates to replicate the multicast traffic and to forward replicated copies of the multicast traffic through the EVPN. In general, replicator PE devices may have a higher replication capacity than ingress PE devices, and therefore may be able to more efficiently replicate multicast traffic compared to ingress PE devices. In the example of FIG. 1, PE devices 10F and 10G are replicator PE devices that may be able to assist ingress PE devices to perform assisted replication of multicast traffic flows. In the example where CE device 8A is the multicast source and where CE device 8B, CE device 8C, and CE device 8D are interested in receiving the multicast traffic flow, ingress PE device 10A may perform assisted replication of the multicast traffic flow by forwarding the multicast traffic flow to replicator PE device 10F. Replicator PE device 10F may receive the multicast traffic flow from ingress PE device 10A, perform replication of the multicast traffic flow, and forward the copies of the multicast traffic flow to CE device 8B, CE device 8C, and CE device 8D.

In accordance with techniques described herein, an ingress PE device in an EVPN that receives a multicast flow from a source device may determine a classification a multicast traffic flow received from a multicast source and may determine, based on the classification of the multicast traffic flow, whether to perform one of: ingress replication of the multicast traffic flow or assisted replication of the multicast traffic flow.

If the ingress PE device is determined to perform ingress replication, the ingress PE device may operate to replicate copies of the multicast traffic flow and to send the replicated copies of the multicast traffic flow to PE devices connected to multicast receivers interested in receiving the multicast traffic flow. If the ingress PE device is determined to perform assisted replication, the ingress PE device may operate to send the multicast traffic flow to a replicator PE device. The replicator PE device may operate to replicate copies of the multicast traffic flow and to send the replicated copies of the multicast traffic flow to PE devices connected to multicast receivers interested in receiving the multicast traffic flow.

A multicast traffic flow can be categorized in any number of ways, such that an ingress PE device may be able to determine whether to perform ingress replication or assisted replication to replicate the multicast traffic flow based on the categorization of the multicast traffic flow. For example, a multicast traffic can be categorized into different flows, such as being categorized as either a second flow or a first flow, where a second flow corresponds to a flow that is to be replicated using assisted replication while a first flow corresponds to a flow that is to be replicated using ingress replication. In some examples, an ingress PE device that receives the multicast traffic flow from a multicast source, may be able to categorize the multicast traffic flow as being a second flow that corresponds to assisted replication or a first flow that corresponds to ingress replication. In other examples, a controller or a flow collector, such as flow collector device 14, may be able to monitor intermediate network 12 to classify multicast traffic flows as being a second flow or a first flow and may send an indication of the classification of a multicast traffic flow to the ingress PE device. In other examples, a combination of the ingress PE device and the controller may classify multicast traffic flows.

In one example, a multicast traffic flow may be classified based on the number of interested receivers for the multicast traffic flow. A multicast traffic flow having relatively smaller number of interested receivers may be classified as being a first flow while a multicast traffic flow having relatively larger number of interested receivers may be classified as being a second flow. In another example, a multicast traffic flow may be classified based on the bandwidth usage of the multicast traffic flow. A multicast traffic flow that uses relatively less bandwidth may be classified as a first flow while a multicast traffic flow that uses relatively more bandwidth may be classified as a second flow. In another example, a multicast traffic flow may be classified based on one or more policies. For example, a policy may specify that latency-sensitive multicast traffic flows, such as multicast traffic flows associated with stock trades, financial transactions, and the like, are classified as first flows, while multicast traffic flows that are not sensitive to latency are classified as second flows.

For example, an ingress PE device, such as PE device 10A, that receives a multicast traffic flow from a multicast source may determine a classification of the multicast traffic flow based at least in part on the channel interest in the multicast traffic flow. The channel interest in the multicast traffic flow may correspond to the number of PE devices that are interested in receiving the multicast traffic flow. Because a PE device in the EVPN that is interested in receiving a particular multicast traffic flow may send a message, such as a SMET (Type 6) route that indicates the PE device's interest in receiving the multicast traffic flow, ingress PE device 10A may count the SMET (Type-6) routes received from other PE devices in the EVPN that indicate interest in receiving the multicast traffic flow to determine the channel interest in the multicast traffic flow as the number of PE devices that are interested in receiving the multicast traffic flow.

Ingress PE device 10A may compare the channel interest in a multicast traffic flow with a channel interest threshold to determine whether the multicast traffic flow is a second flow or a first flow. In some examples, ingress PE device 10A may determine that the multicast traffic flow is a second flow if the channel interest in the multicast traffic flow is greater than a channel interest threshold. Correspondingly, ingress PE device 10A may determine that the multicast traffic flow is a first flow if the channel interest in the multicast traffic flow is less than or equal to a channel interest threshold.

Thus, if ingress PE device 10A determines that the channel interest in the multicast traffic flow is greater than the channel interest threshold, ingress PE device 10A may perform assisted replication of the multicast traffic flow, such as by sending the multicast traffic flow to replicator PE device 10F so that replicator PE device 10F may replicate the multicast traffic flow and send copies of the multicast traffic flow to interested PE devices. On the other hand, if ingress PE device 10A determines that the channel interest in the multicast traffic flow is less than or equal to the channel interest threshold, ingress PE device 10A may perform ingress replication of the multicast traffic flow, such as by replicating the multicast traffic flow and sending copies of the multicast traffic flow to interested PE devices without use of a replicator PE device.

In some examples, an ingress PE device that receives a multicast traffic flow may export multicast flow records associated with the multicast traffic flow to flow collector device 14. Flow collector device 14 may collect multicast flow records of multicast traffic flows in order to classify multicast traffic flows based on the collected flow records. Such flow records may include, for a multicast traffic flow, information such as the Internet Protocol (IP) source address, the IP destination address, the VLAN, the EVI, the L4 source port, the L4 destination port, the IP protocol, the IP terms of service (TOS), the flow direction, the rate of the multicast traffic flow, the number of packets and/or bytes sent, a timestamp, and the like. Flow collector device 14 of intermediate network 12 may analyze the flow records of a multicast traffic flow to classify the multicast traffic flow as a second flow or as a first flow, and may send, to the ingress PE device receiving the multicast traffic flow, an indication of the classification of the multicast traffic flow.

For example, flow collector device 14 may determine the bandwidth usage of a multicast traffic flow based on the multicast flow records and may classify the multicast traffic flow based on the bandwidth usage of the multicast traffic flow. For example, flow collector device 14 may, based on the rate of the flow, the packets sent in the flow and/or the bytes sent in the flow specified by the multicast flow records to derive the bandwidth usage of the multicast traffic flow, such as in the form of bits per second, and may compare the bandwidth usage of the multicast traffic flow to a bandwidth usage threshold.

If flow collector device 14 determines that the bandwidth usage of the multicast traffic flow is greater than the bandwidth usage threshold, flow collector device 14 may classify the multicast traffic flow as a second flow. Conversely, if flow collector device 14 determines that the bandwidth usage of the multicast traffic flow is less than or equal to the bandwidth usage threshold, flow collector device 14 may classify the multicast traffic flow as a first flow. Flow collector device 14 may therefore send an indication of the classification of the multicast traffic flow to the ingress PE device, such as ingress PE device 10A, that is receiving the multicast traffic flow from a multicast receiver.

Ingress PE device 10A may determine the classification of a multicast traffic flow associated with the bandwidth usage of the multicast traffic flow by receiving, from flow collector device 14, an indication of the classification of the multicast traffic flow. Ingress PE device 10A may, in response, determine whether to perform ingress replication or assisted replication to replicate the multicast traffic flow based on the classification of the multicast traffic flow. If ingress PE device 10A determines that the classification of the multicast traffic flow classifies the multicast traffic flow as a first flow, ingress PE device 10A may perform ingress replication of the multicast traffic flow. On the other hand, if ingress PE device 10A determines that the classification of the multicast traffic flow classifies the multicast traffic flow as a second flow, ingress PE device 10A may perform assisted replication of the multicast traffic flow.

In some examples, ingress PE device 10A may determine the classification of a multicast traffic flow based on one or more replication policies, such as received from flow collector device 14 or directly configured on ingress PE device 10A. For example, a policy may specify certain types of multicast traffic flows are second flows to be replicated using assisted replication and that certain types of multicast traffic flows are first flows to be replicated using ingress replication.

For example, a policy may specify that certain latency-sensitive multicast traffic flows, such as multicast traffic flows related to securities trades, financial transactions, and the like, are to be replicated using ingress replication while other multicast traffic flows are to be replicated using assisted replication. Ingress PE device 10A may therefore determine the classification of a multicast traffic flow and determine whether to perform ingress replication or assisted replication based on determining whether the multicast traffic flow is a latency-sensitive multicast traffic flow. For example, if ingress PE device 10A determines that a multicast traffic flow is a latency-sensitive traffic flow, ingress PE device 10A may perform ingress replication to replicate the multicast traffic flow. Conversely, if ingress PE device 10A determines that a multicast traffic flow is not a latency-sensitive traffic flow, ingress PE device 10A may perform assisted replication to replicate the multicast traffic flow.

In some examples, ingress PE device 10A may use a combination of techniques described herein in order to determine whether to perform ingress replication or assisted replication of a multicast traffic flow. For example, ingress PE device 10A may determine the classification of a multicast traffic flow, such as by receiving, from flow collector device 14, an indication of the classification of the multicast traffic flow as either a second flow or a first flow. Flow collector device 14 may make such a determination of the classification of the multicast traffic flow based on, for example, the bandwidth usage of the multicast traffic flow, as described above. If ingress PE device 10A receives an indication that the multicast traffic flow is a second flow, ingress PE device 10A may perform assisted replication of the multicast traffic flow.

However, if ingress PE device 10A receives an indication that the multicast traffic flow is a first flow, ingress PE device 10A may further determine whether to perform assisted replication or ingress replication of the multicast traffic flow based on the channel interest in the multicast traffic flow. If ingress PE device 10A determines that the channel interest in the multicast traffic flow is greater than the channel interest threshold, PE device 10A may perform assisted replication of the multicast traffic flow. Conversely, if ingress PE device 10A determines that the channel interest in the multicast traffic flow is less than or equal to the channel interest threshold, PE device 10A may perform ingress replication of the multicast traffic flow.

In some examples, PE devices 10 may adaptively switch between performing ingress replication and assisted replication for a multicast traffic flow, such as due to changes in classifying the multicast traffic flow, dynamic updates to policies, and the like. In some examples, when ingress PE device 10A receives a multicast traffic flow from a multicast source, ingress PE device 10A may start performing ingress replication of the multicast traffic flow before the multicast traffic flow has been classified, such as before ingress PE device 10A has determined the classification of the multicast traffic flow.

If ingress PE device 10A subsequently determines that the multicast traffic flow is a second flow, ingress PE device 10A may therefore switch from performing ingress replication to performing assisted replication by forwarding the multicast traffic flow to replicator PE device 10A. As ingress PE device 10A performs assisted replication by forwarding the multicast traffic flow to replicator PE device 10F, if ingress PE device 10A determines that the multicast traffic flow is a first flow, ingress PE device 10A may be able to switch back from performing assisted replication to performing ingress replication. In this way, the techniques of this disclosure facilitate ingress PE devices to be able to dynamically switch between assisted replication and ingress replication for a multicast traffic flow.

Figure 2:
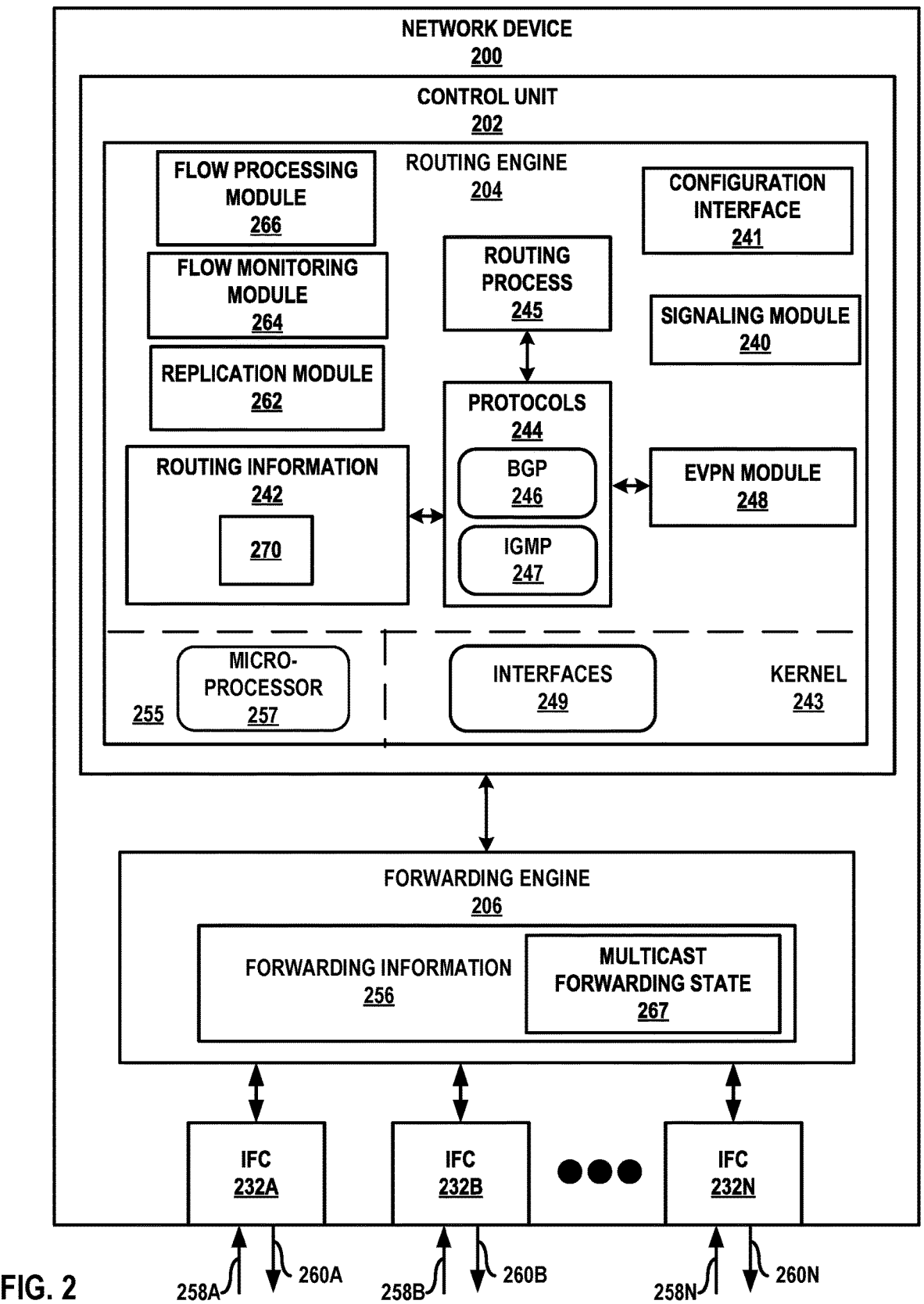
FIG. 2 is a block diagram illustrating an example of a network device of FIG. 1, in accordance with techniques described in this disclosure.

FIG. 2 is a block diagram illustrating an example of a network device of FIG. 1, in accordance with techniques described in this disclosure. In some examples, network device 200 may represent an example instance of any of PE devices 10 of FIG. 1 or an example of flow controller device 14 of FIG. 1. Network device 200 includes a control unit 202 that includes a routing engine 204, and control unit 202 is coupled to a forwarding engine 206. Forwarding engine 206 is associated with one or more of interface cards 232A-232N ("IFCs 232") that receive packets via inbound links 258A-258N ("inbound links 258") and send packets via outbound links 260A-260N ("outbound links 260"). IFCs 232 are typically coupled to links 258, 260 via a number of interface ports (not shown). Interfaces for inbound links 258 and outbound links 260 may represent physical interfaces, logical interfaces, or some combination thereof. Interfaces for links 258, 260 may represent local interfaces of network device 200.

Elements of control unit 202 and forwarding engine 206 may be implemented solely in software, or hardware, or may be implemented as combinations of software, hardware, or firmware. For example, control unit 202 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 202 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of Network device 200, e.g., protocols. Control unit 202, in some examples, retrieves and executes the instructions from memory for these aspects.

Routing engine 204 includes kernel 243, which provides a run-time operating environment for user-level processes. Kernel 243 may represent, for example, a UNIX operating system derivative such as Linux or Berkeley Software Distribution (BSD). Kernel 243 offers libraries and drivers by which user-level processes may interact with the underlying system. Hardware environment 255 of routing engine 204 includes microprocessor 257 that executes program instructions loaded into a main memory (not shown in FIG. 2) from a storage device (also not shown in FIG. 2) in order to execute the software stack, including both kernel 243 and processes executing on the operating environment provided by kernel 243. Microprocessor 257 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 243 provides an operating environment for a routing process 245 that executes various protocols 244 at different layers of a network stack, including protocols for implementing Ethernet Virtual Private Networks. For example, routing engine 204 includes network protocols that operate at a network layer of the network stack. In the example of FIG. 2, network protocols include the Border Gateway Protocol (BGP) 246. The network protocols may also include Internet Group Management Protocol (IGMP) 247. Routing engine 204 may also include other protocols, such as an MPLS label distribution protocol and/or other MPLS protocols not shown in FIG. 2. Routing engine 204 is responsible for the maintenance of routing information 242 to reflect the current topology of a network and other network entities to which network device 200 is connected. In particular, routing protocols periodically update routing information 242 to accurately reflect the topology of the network and other entities based on routing protocol messages received by network device 200. Routing engine 204 may further include a multicast state information that maintains IGMP state data for a plurality of multicast groups to which network device 200 belongs. Multicast state information may be a table, database, or any type of data structure.

Kernel 243 includes an interfaces table 249 ("interfaces 249") that represents a data structure that includes a corresponding entry for each logical interface configured for network device 200. Logical interfaces may correspond to local interfaces of network device 200. Entries for respective logical interfaces may specify respective current information describing the logical interfaces.

Routing information 242 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF).

Routing engine 204 also includes an EVPN module 248 that performs L2 learning using BGP 246. EVPN module 248 may maintain tables for each EVPN instance (EVI) established by network device 200, or in alternative examples, may maintain one or more tables that are independent of each respective EVI. In some examples, and in accordance with one or more techniques described in this disclosure, Network device 200 may use EVPN module 248 to advertise, e.g., EVPN routes, such as Selective Multicast Ethernet Tag (SMET) (Type 6 route) to other PE devices of the EVPN network to indicate a multicast traffic flow has started for network device 200 or that a CE device attached to network device 200 is interested in receiving a particular multicast traffic flow.

Signaling module 240 outputs control plane messages to automatically establish tunnels to interconnect multiple network devices including network device 200 and otherwise provision one or more EVIs configured for network device 200 and other network devices. Signaling module 240 may signal the network devices using one or more suitable tunnel signaling protocols, such as GRE, VXLAN, and/or MPLS protocols. Signaling module 240 can communicate with forwarding engine 206 to automatically update forwarding information 256. In some examples, signaling module 240 may be part of or executed by routing process 245.

Routing engine 204 also includes a configuration interface 241 that receives and may report configuration data for network device 200. Configuration interface 241 may represent a command line interface; a graphical user interface; Simple Network Management Protocol (SNMP), Netconf, or another configuration protocol; or some combination of the above in some examples. Configuration interface 241 receives configuration data configuring the network device 200, and other constructs that at least partially define the operations of network device 200, including the techniques described herein. For example, an administrator may, after powering-up, activating, or otherwise enabling network device 200 to operate within a network, interact with control unit 202 via configuration interface 241 to configure network device 200 to determine whether a multicast traffic flow has started, and in response to determining that the multicast traffic flow has started, create and send multicast flow records associated with the multicast traffic flow to, e.g., flow collector device 14.

In another example, configuration interface 241 of network device 200 may receive configuration data from a remote network device, such as flow collector device 14. For example, configuration interface 241 may receive, from flow collector device 14, configuration data such as one or more replication policies that network device 200 may follow when determining whether to perform ingress replication or assisted replication to replicate a multicast traffic flow. In other examples, configuration interface 241 may represent a command-line interface to receive configuration data from a user or administrator to configure one or more replication policies for network device 200.

Routing process 245 outputs control-plane messages to automatically establish tunnels such as LSPs, and otherwise provision one or more EVPNs between network device 200 and each of the other PE devices participating in the EVPN. For example, routing process 245 may use EVPN module 248 to generate EVPN routes and send and receive, via BGP 246 sessions with other network devices, the EVPN routes. Routing process 245 may store generated EVPN routes and import/store received EVPN routes to a route table storing EVPN routes.

Forwarding engine 206 represents hardware and logic functions that provide high-speed forwarding of network traffic. Forwarding engine 206 typically includes a set of one or more forwarding chips programmed with forwarding information 256 that maps network destinations with specific next hops and the corresponding output interface ports. In general, when network device 200 receives a packet via one of inbound links 258, forwarding engine 206 identifies an associated next hop for the data packet by traversing the programmed forwarding information 256 based on information within the packet. Forwarding engine 206 forwards the packet on one of outbound links 260 mapped to the corresponding next hop.

In the example of FIG. 2, forwarding engine 206 includes forwarding information 256. In accordance with routing information 242, forwarding engine 206 stores forwarding information 256 that maps packet field values to network destinations with specific next hops and corresponding outbound interface ports. For example, routing engine 204 analyzes information stored in routing information 242 and generates forwarding information for forwarding engine 206, stored in forwarding information 256. Forwarding information 256 may also include multicast forwarding state 267 including information that may associate, for example, network destinations for certain multicast groups with specific next hops and corresponding IFCs 232 and physical output ports for output links 260. Forwarding information 256 may be maintained in the form of one or more tables, link lists, radix trees, databases, flat files, or any other data structures.

In some examples, network device 200 may receive a SMET route at one of IFCs 232, and IFCs 232 may store the SMET route in memory accessible by routing engine 204. Routing process 245 processes the SMET route to add multicast forwarding state for (*, G) or (S, G) for multicast forwarding state 267. The multicast forwarding state 267 may be associated with the EVPN instance and so be applied to EVPN traffic for the EVPN instance, such as multicast traffic for (*, G) or (S, G). Routing process 245 may also translate the SMET route to an IGMP route and send the IGMP route via an interface for an outbound link of outbound links 260 that is connected to a PIM device.

According to the techniques described in this disclosure, if network device 200 is an ingress PE device, such as ingress PE device 10A of FIG. 1, network device 200 may include multicast flow module 266 operable to determine whether a multicast traffic flow has started, and if so, determine whether to perform ingress replication, such as by using replication module 262. Flow processing module 266 may determine whether to perform ingress replication or assisted replication of a multicast traffic flow received by network device 200. If flow processing module 266 determines to perform assisted replication of the multicast traffic flow, flow processing module 266 may configure forwarding engine 206 to forward the multicast traffic flow to a replicator PE device in the EVPN. For example, flow processing module 266 may configure an interface for an outbound link of outbound links 260 connected to a replicator PE device, such as replicator PE device 10F or replicator PE device 10G, to forward the multicast traffic flow to a replicator PE device.

If flow processing module 266 determines to perform ingress replication of the multicast traffic flow, replication module 262 may replicate the multicast traffic flow to generate copies of the multicast traffic flow and to forward the copies of the multicast traffic flow to interested PE devices. As flow processing module 266 receives a stream of packets making up the multicast traffic flow, replication module 262 may, in response to determining to perform ingress replication of the multicast traffic flow, make copies of the packets in the stream of packets and may forward copies of the packets to interested PE devices.

For example, replication module 262 may configure forwarding engine 206 to forward the copies of the multicast traffic flow to PE devices in the EVPN that have indicated interest in receiving the multicast traffic flow, such as PE devices that have sent SMET routes (Type 6 routes) indicative of interest in receiving the multicast traffic flow. Replication module 262 may configure interfaces for outbound links 260 connected to PE devices that are interested in receiving the flow to forward the copies of the multicast traffic flow to the interested PE devices.

Flow processing module 266 may determine whether network device 200 is to perform ingress replication or assisted replication based at least in part on classifying the multicast traffic flow. For example, flow processing module 266 may classify a multicast traffic flow as a second flow or a first flow, where a second flow corresponds to a multicast traffic flow that network device 200 may replicate using assisted replication, and a first flow corresponds to a multicast traffic flow that network device 200 may replicate using ingress replication.

Flow processing module 266 may classify a multicast traffic flow based at least in part on channel interest in the multicast traffic flow. The channel interest in the multicast traffic flow may correspond to the number of PE devices that are interested in receiving the multicast traffic flow. Because a PE device in the EVPN that is interested in receiving a particular multicast traffic flow may send a message, such as a SMET route that indicates the PE device's interest in receiving the multicast traffic flow, flow processing module 266 may count the SMET routes received from other PE devices in the EVPN that indicate interest in receiving the multicast traffic flow to determine the channel interest in the multicast traffic flow as the number of PE devices that are interested in receiving the multicast traffic flow.

Flow processing module 266 may compare the channel interest in a multicast traffic flow with a channel interest threshold to determine whether the multicast traffic flow is a second flow or a first flow. In some examples, flow processing module 266 may determine that the multicast traffic flow is a second flow if the channel interest in the multicast traffic flow is greater than a channel interest threshold. Correspondingly, flow processing module 266 may determine that the multicast traffic flow is a first flow if the channel interest in the multicast traffic flow is less than or equal to a channel interest threshold. A user or administrator may configure the channel interest threshold for network device 200 via configuration interface 241 and/or network device 200 may receive the channel interest threshold from a controller (e.g., flow collector device 14 of FIG. 1).

In some examples, flow processing module 266 may determine the channel interest threshold based on the replication capacity of network device 200. For example, if network device 200 has a replication capacity of 200, flow processing module 266 may determine whether the channel interest in the multicast traffic flow is greater than 200. If the channel interest in the multicast traffic flow is greater than 200, flow processing module 266 may classify the multicast traffic flow as a second flow. Conversely, if the channel interest in the multicast traffic flow is less than or equal to 200, flow processing module 266 may classify the multicast traffic flow as a first flow.

In another example, if network device 200 has a replication capacity of 200, and if network device 200 is currently performing ingress replication by replicating 50 copies of another multicast traffic flow, then the channel interest threshold for replicating a multicast traffic flow may be 150. Thus, flow processing module 266 may determine whether the channel interest in the multicast traffic flow is greater than 150. If the channel interest in the multicast traffic flow is greater than 150, flow processing module 266 may classify the multicast traffic flow as a second flow. Conversely, if the channel interest in the multicast traffic flow is less than or equal to 150, flow processing module 266 may classify the multicast traffic flow as a first flow.

As described above, if flow processing module 266 classifies a multicast traffic flow as a large traffic flow, network device 200 may perform assisted replication of the multicast traffic flow. Conversely, if flow processing module 266 classifies a multicast traffic flow as a lean traffic flow, network device 200 may perform ingress replication of the multicast traffic flow. In some examples, even if flow processing module 266 determines that the channel interest in a multicast traffic flow is greater than the channel threshold, flow processing module 266 may perform ingress replication along with assisted replication of the multicast traffic flow. For example, if the channel interest threshold is 50, if the capacity of a replicator PE device is 200, and if the channel interest in the multicast traffic flow is 250, network device 200 may perform ingress replication to replicate 50 copies of the multicast traffic flow and may use the replicator PE device to perform assisted replication to replicate 200 copies of the multicast traffic flow.

In some examples, the channel interest in a multicast traffic flow may change over time, such as by increasing or decreasing over time. As such, flow processing module 266 may change the classification of a multicast traffic flow as a first flow or a second flow over time based on changes in the channel interest in a multicast traffic flow. For example, flow processing module 266 may initially classify a multicast traffic flow as a first flow based on the channel interest in the multicast traffic flow as being less than or equal to a channel interest threshold and network device 200 may therefore perform ingress replication of the multicast traffic flow. As channel interest in the multicast traffic flow increases over time, the channel interest in the multicast traffic flow may increase above the channel interest threshold. Thus, flow processing module 266 may, in response to determining that the multicast traffic flow has increased above the channel interest threshold, re-classify the multicast traffic flow as a second flow and may therefore change from performing ingress replication to performing assisted replication of the multicast traffic flow.

In some examples, flow processing module 266 may communicate with a controller and/or flow collector device, such as flow collector device 14 of FIG. 1 to classify a multicast traffic flow. As flow processing module 266 receives a multicast traffic flow from a multicast source, flow processing module 266 may continuously and/or periodically create and export multicast flow records associated with the multicast traffic flow to flow collector device 14. The multicast flow records associated with the multicast traffic flow may include information regarding the multicast traffic flow, such as the source network address, the destination network address, the source port, the destination port, the VLAN, the EVI, the IP protocol, the IP terms of service, the flow direction, the rate of the flow, the packets and/or bytes sent in the flow, the timestamp of packets of the flow, and the like.

The flow collector device may receive the multicast flow records associated with the multicast traffic flow from an ingress PE device. In the example where network device 200 is the flow collector device, network device 200 may execute flow monitoring module 264 to monitor the multicast traffic flows from PE devices of an EVPN. Flow monitoring module 264 may receive the multicast flow records associated with the multicast traffic flow from an ingress PE device, analyze the multicast flow records to determine flow characteristics of the multicast traffic flow, and categorize the multicast traffic flow based on the flow characteristics of the multicast traffic flow.

In some examples, flow monitoring module 264 may determine the bandwidth usage of a multicast traffic flow based on the multicast flow records and may classify the multicast traffic flow based on the bandwidth usage of the multicast traffic flow. For example, flow monitoring module 264 may, based on the rate of the flow, the packets sent in the flow and/or the bytes sent in the flow specified by the multicast flow records to derive the bandwidth usage of the multicast traffic flow, such as in the form of bits per second.

Flow monitoring module 264 may compare the bandwidth usage of the multicast traffic flow to a bandwidth usage threshold.

If flow monitoring module 264 determines that the bandwidth usage of the multicast traffic flow is greater than the bandwidth usage threshold, flow monitoring module 264 may classify the multicast traffic flow as a second flow. Conversely, if flow monitoring module 264 determines that the bandwidth usage of the multicast traffic flow is less than or equal to the bandwidth usage threshold, flow monitoring module 264 may classify the multicast traffic flow as a first flow. Flow monitoring module 264 may therefore send an indication of the classification of the multicast traffic flow to the ingress PE device that is receiving the multicast traffic flow from a multicast receiver. Flow processing module 266 of the ingress PE device may receive the indication of the classification of the multicast traffic flow and may perform replication of the multicast traffic flow based on the classification of the multicast traffic flow, as described above.

In some examples, flow processing module 266 may receive one or more policies from a controller and/or flow collector device, such as flow collector device 14 of FIG. 1, and may classify a multicast traffic flow based at least in part on the one or more policies. Such policies may help to ensure optimal use of ingress PE devices and replicator PE devices in an EVPN and to balance the replication load on the of ingress PE devices and the replicator PE devices in the EVPN.

For example, flow monitoring module 264 of a flow collector device may monitor multicast traffic flows being handled by the multitude of PE devices in the EVPN by receiving, from ingress PE devices of the EVPN, multicast flow records associated with the multicast traffic flows. Flow monitoring module 264 may analyze, such as via machine learning, artificial intelligence, or any other suitable methods, the multicast flow records of multicast traffic flows to determine one or more policies for PE devices for replicating multicast traffic flows. Flow monitoring module 264 may therefore push the one or more policies to the PE devices in the EVPN via configuration protocols, such as Netconf.

In some examples, a policy may specify certain types of multicast traffic flows are second flows to be replicated using assisted replication and that certain types of multicast traffic flows are first flows to be replicated using ingress replication. Flow processing module 266 of an ingress PE device may therefore determine, for a multicast traffic flow, the type of the multicast traffic flow, to determine whether to perform ingress replication or assisted replication to replicate the multicast traffic flow.

For example, a policy may specify that certain latency-sensitive multicast traffic flows, such as multicast traffic flows related to securities trades, financial transactions, and the like, are to be replicated using ingress replication while other multicast traffic flows are to be replicated using assisted replication. Flow processing module 266 may inspect the multicast traffic flow, such as by determining the source address of the multicast traffic flow, determining the destination addresses of the multicast traffic flow, performing deep packet inspection of the multicast traffic flow, and the like, in order to determine whether the multicast traffic flow is a latency-sensitive multicast traffic. For example, flow processing module 266 may determine whether the source address or the destination address is associated with a financial institution and, if so, may determine that the multicast traffic flow is a latency-sensitive multicast traffic flow.

In some examples, flow processing module 266 may use a combination of techniques described herein in order to determine whether to perform ingress replication or assisted replication of a multicast traffic flow. For example, if flow monitoring module 264 of a flow collector device classifies a multicast traffic flow based on bandwidth usage, flow processing module 266 may receive, from the flow collector device, an indication of a classification of a multicast traffic flow that is indicative of the bandwidth usage of the multicast traffic flow. If flow processing module 266 receives an indication that the multicast traffic flow is a second flow, then the bandwidth usage of the multicast traffic flow is above the bandwidth usage threshold. Conversely, if flow processing module 266 receives an indication that the multicast traffic flow is a first flow, then the bandwidth usage of the multicast traffic flow is less than or equal to the bandwidth usage threshold.

If flow processing module 266 receives an indication that the multicast traffic flow is a second flow, then flow processing module 266 may perform assisted replication of the multicast traffic flow. However, if flow processing module 266 receives an indication that the multicast traffic flow is a first flow, flow processing module 266 may not necessarily perform ingress replication of the multicast traffic flow. Instead, if the multicast traffic flow is a first flow, flow processing module 266 may determine the channel interest in the multicast traffic flow. If flow processing module 266 determines that the channel interest in the first flow is greater than the channel interest threshold, flow processing module 266 may nonetheless perform assisted replication of the first flow. Conversely, if flow processing module 266 determines that the channel interest in the first flow is less than or equal to the channel interest threshold, flow processing module 266 may perform ingress replication of the first flow.

Figure 3:
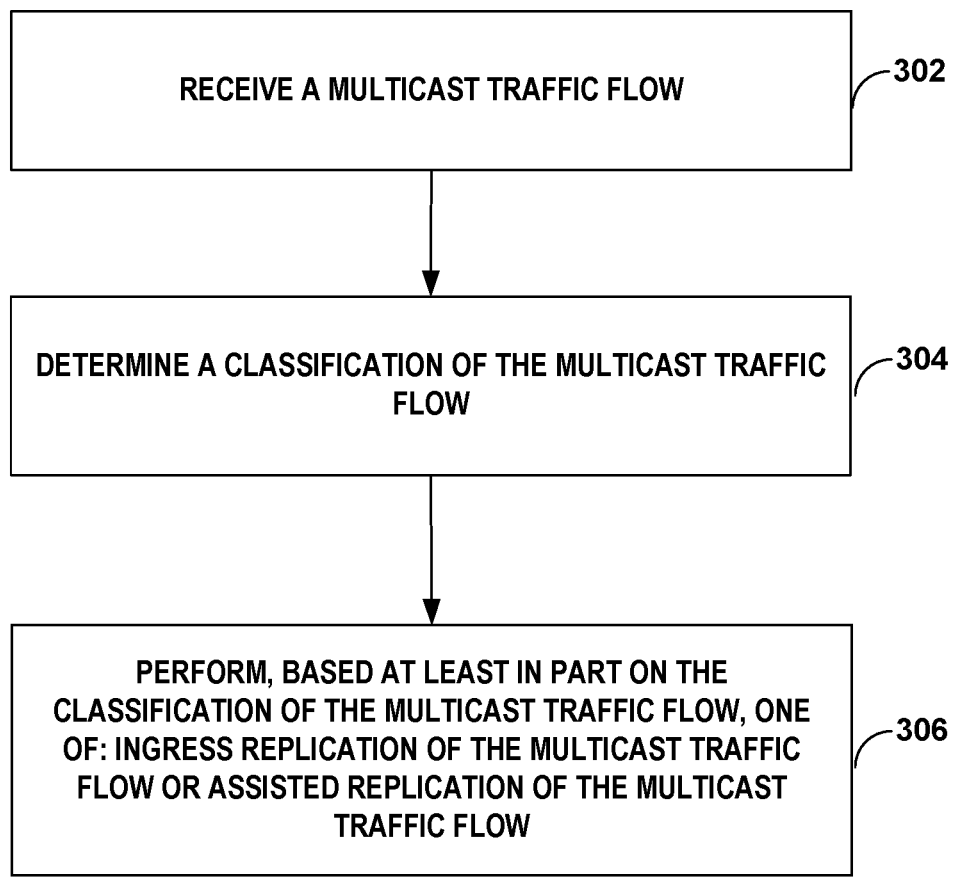
FIG. 3 is a flowchart illustrating an example operation of provider edge devices that perform replication of multicast traffic flows, in accordance with techniques described in this disclosure.

FIG. 3 is a flowchart illustrating an example operation of provider edge devices that perform replication of multicast traffic flows, in accordance with techniques described in this disclosure. FIG. 3 is described with respect to network device 200 of FIG. 2 deployed as PE device 10A of FIG. 1 but may be performed by any ingress PE device of the EVPN.

In the example of FIG. 3, PE device 10A may receive a multicast traffic flow, such as from a multicast source (302). PE device 10A may determine a classification of the multicast traffic flow (304). In some examples, PE device 10A may determine whether the multicast traffic flow is a second flow or a first flow. In some examples, a controller or a flow collector, such as flow collector device 14, may be able to classify multicast traffic flows as being a second flow or a first flow and may send an indication of the classification of a multicast traffic flow to the ingress PE device.

In some examples, PE device 10A may determine channel interest in the multicast traffic, where the channel interest corresponds to a number of the plurality of PE devices that are interested in receiving the multicast traffic flow, and may determine the classification of the multicast traffic based at least in part on the channel interest in the multicast traffic flow. In some examples, PE device 10A may compare the channel interest in the multicast traffic flow with a channel interest threshold to determine the classification of the multicast traffic flow and may, in response to determining that the channel interest in the multicast traffic flow is greater than the channel interest threshold, determine that the multicast traffic flow is a second flow. In some examples, PE device 10A may determine the channel interest in the multicast traffic flow in response to receiving, from a flow collector device, an indication that the multicast traffic flow is a first flow.

In some examples, the classification of the multicast traffic flow is based at least in part on bandwidth usage associated with the multicast traffic flow. In some examples, PE device 10A may determine, based in part on a policy imposed on the ingress PE device 10A, the classification of the multicast traffic flow.

PE device 10A may perform, based at least in part on the classification of the multicast traffic flow, one of: ingress replication of the multicast traffic flow or assisted replication of the multicast traffic flow (306). In some examples, PE device 10A may, in response to the classification of the multicast traffic flow indicating that the multicast traffic flow is a second flow, perform assisted replication of the multicast traffic flow. In some examples, PE device 10A may, in response to the classification of the multicast traffic flow indicating that the multicast traffic flow is a first flow, perform ingress replication of the multicast traffic flow.

In some examples, to perform the ingress replication of the multicast traffic flow, PE device 10A may determine an updated classification of the multicast traffic flow and based on the updated classification of the multicast traffic flow, switch from performing the ingress replication of the multicast traffic flow to performing the assisted replication of the multicast traffic flow.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

What is claimed is:

1. A method comprising:
   receiving, by an ingress provider edge (PE) device of a plurality of PE devices that participate in an Ethernet Virtual Private Network (EVPN), a multicast traffic flow;
   determining, by the ingress PE device, a classification of the multicast traffic flow; and
   performing, by the ingress PE device and based at least in part on the classification of the multicast traffic flow, one of: ingress replication of the multicast traffic flow or assisted replication of the multicast traffic flow.

2. The method of claim 1, wherein determining the classification of the multicast traffic flow comprises determining, by the ingress PE device, whether the multicast traffic flow is a second flow that corresponds to assisted replication or a first flow that corresponds to ingress replication, and
   wherein performing, based at least in part on the classification of the multicast traffic flow, one of: the ingress replication of the multicast traffic flow or the assisted replication of the multicast traffic flow further comprises: in response to the classification of the multicast traffic flow indicating that the multicast traffic flow is the second flow that corresponds to assisted replication, performing, by the ingress PE device, assisted replication of the multicast traffic flow.

3. The method of claim 1, wherein determining the classification of the multicast traffic flow comprises determining, by the ingress PE device, whether the multicast traffic flow is a second flow that corresponds to assisted replication or a first flow that corresponds to ingress replication, and
   wherein performing, based at least in part on the classification of the multicast traffic flow, one of: the ingress replication of the multicast traffic flow or the assisted replication of the multicast traffic flow further comprises: in response to the classification of the multicast traffic flow indicating that the multicast traffic flow is the first flow that corresponds to ingress replication, performing, by the ingress PE device, the ingress replication of the multicast traffic flow.

4. The method of claim 1, wherein determining the classification of the multicast traffic flow further comprises:
   determining, by the ingress PE device, channel interest in the multicast traffic flow, wherein the channel interest corresponds to a number of the plurality of PE devices that are interested in receiving the multicast traffic flow; and
   determining, by the ingress PE device, the classification of the multicast traffic based at least in part on the channel interest in the multicast traffic flow.

5. The method of claim 4, wherein determining the classification of the multicast traffic flow based at least in part on the channel interest in the multicast traffic flow further comprises:
- comparing, by the ingress PE device, the channel interest in the multicast traffic flow with a channel interest threshold to determine the classification of the multicast traffic flow; and
- in response to determining that the channel interest in the multicast traffic flow is greater than the channel interest threshold, determining, by the ingress PE device, that the multicast traffic flow is a second flow.

6. The method of claim 4, wherein determining the channel interest in the multicast traffic flow is in response to receiving, by the ingress PE device from a flow collector device, an indication that the multicast traffic flow is a first flow.

7. The method of claim 1, wherein the classification of the multicast traffic flow is based at least in part on bandwidth usage associated with the multicast traffic flow.

8. The method of claim 1, wherein determining the classification of the multicast traffic flow further comprises:
- determining, by the ingress PE device and based in part on a policy imposed on the ingress PE device, the classification of the multicast traffic flow.

9. The method of claim 1, wherein performing one of: the ingress replication of the multicast traffic flow or the assisted replication of the multicast traffic flow comprises performing the ingress replication of the multicast traffic flow, the method further comprising:
- determining, by the ingress PE device, an updated classification of the multicast traffic flow; and
- based on the updated classification of the multicast traffic flow, switching, by the ingress PE, from performing the ingress replication of the multicast traffic flow to performing the assisted replication of the multicast traffic flow.

10. A network device operable as an ingress provider edge (PE) device of a plurality of PE devices participating in an Ethernet Virtual Private Network (EVPN), comprising:
- a memory; and
- one or more processors operably coupled to the memory, wherein the one or more processors are configured to:
  - receive a multicast traffic flow;
  - determine a classification of the multicast traffic flow; and
  - perform, based at least in part on the classification of the multicast traffic flow, one of: ingress replication of the multicast traffic flow or assisted replication of the multicast traffic flow.

11. The network device of claim 10, wherein to determine the classification of the multicast traffic flow the one or more processors are further configured to determine whether the multicast traffic flow is a second flow or a first flow, and
- wherein to perform, based at least in part on the classification of the multicast traffic flow, one of: the ingress replication of the multicast traffic flow or the assisted replication of the multicast traffic flow, the one or more processors are further configured to, in response to the classification of the multicast traffic flow indicating that the multicast traffic flow is the second flow, perform the assisted replication of the multicast traffic flow.

12. The network device of claim 10, wherein to determine the classification of the multicast traffic flow, the one or more processors are further configured to determine whether the multicast traffic flow is a second flow or a first flow, and
- wherein to perform, based at least in part on the classification of the multicast traffic flow, one of: the ingress replication of the multicast traffic flow or the assisted replication of the multicast traffic flow, the one or more processors are further configured to, in response to the classification of the multicast traffic flow indicating that the multicast traffic flow is the first flow, perform the ingress replication of the multicast traffic flow.

13. The network device of claim 10, wherein to determine the classification of the multicast traffic flow, the one or more processors are further configured to:
- determine channel interest in the multicast traffic flow, wherein the channel interest corresponds to a number of the plurality of PE devices that are interested in receiving the multicast traffic flow; and
- determine the classification of the multicast traffic based at least in part on the channel interest in the multicast traffic flow.

14. The network device of claim 13, wherein to determine the classification of the multicast traffic flow based at least in part on the channel interest in the multicast traffic flow, the one or more processors are further configured to:
- compare the channel interest in the multicast traffic flow with a channel interest threshold to determine the classification of the multicast traffic flow; and
- in response to determining that the channel interest in the multicast traffic flow is greater than the channel interest threshold, determine that the multicast traffic flow is a second flow.

15. The network device of claim 13, wherein the one or more processors are configured to determine the channel interest in the multicast traffic flow in response to receiving, from a flow collector device, an indication that the multicast traffic flow is a first flow.

16. The network device of claim 10, wherein the classification of the multicast traffic flow is based at least in part on bandwidth usage associated with the multicast traffic flow.

17. The network device of claim 10, wherein to perform one of: the ingress replication of the multicast traffic flow or the assisted replication of the multicast traffic flow, the one or more processors are further configured to:
- perform the ingress replication of the multicast traffic flow;
- determine an updated classification of the multicast traffic flow; and
- based on the updated classification of the multicast traffic flow, switch from performing the ingress replication of the multicast traffic flow to performing the assisted replication of the multicast traffic flow.

18. A system comprising:
- a flow controller device configured to perform ingress multicast flow monitoring on a plurality of PE devices that participate in an Ethernet Virtual Private Network (EVPN); and
- an ingress provider edge (PE) device of the plurality of PE devices that participate in the EVPN and configured to:
  - receive a multicast traffic flow; and
  - export multicast flow records associated with the multicast traffic flow to the flow controller device;
- wherein the flow controller device is further configured to:
  - determine, based at least in part on the multicast flow records, a classification of the multicast traffic flow, and
  - send an indication of the classification of the multicast traffic flow to the ingress PE device; and wherein the ingress PE device is further configured to:
receive the indication of the classification of the multicast traffic flow, and
perform, based at least in part on the classification of the multicast traffic flow, one of: ingress replication of the multicast traffic flow or assisted replication of the multicast traffic flow.

19. The system of claim 18, wherein to determine the classification of the multicast traffic flow, the flow controller device is further configured to:
determine, based at least in part on the multicast flow records, bandwidth usage associated with the multicast traffic flow;
comparing the bandwidth usage associated with the multicast traffic flow with a bandwidth usage threshold; and
determining, based at least in part on comparing the bandwidth usage with the bandwidth usage threshold, the classification of the multicast traffic flow.

20. The system of claim 19, wherein:
to receive the indication of the classification of the multicast traffic flow, the PE device is further configured to receive an indication that the multicast traffic flow is a first flow; and
to perform one of: the ingress replication of the multicast traffic flow or the assisted replication of the multicast traffic flow, the ingress PE device is further configured to:
in response to the multicast traffic flow is the first flow, determining whether to perform the ingress replication of the multicast traffic flow or the assisted replication of the multicast traffic flow based on a channel interest in the multicast traffic flow, wherein the channel interest corresponds to a number of the plurality of PE devices that are interested in receiving the multicast traffic flow.

* * * * *